(12) United States Patent
Lane

(10) Patent No.: US 9,991,650 B2
(45) Date of Patent: Jun. 5, 2018

(54) CONNECTOR ASSEMBLY

(71) Applicant: TYCO ELECTRONICS CORPORATION, Berwyn, PA (US)

(72) Inventor: David James Lane, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 50 days.

(21) Appl. No.: 15/003,966

(22) Filed: Jan. 22, 2016

(65) Prior Publication Data

US 2017/0214191 A1    Jul. 27, 2017

(51) Int. Cl.
| H01R 9/05 | (2006.01) |
| H01R 24/40 | (2011.01) |
| H01R 43/16 | (2006.01) |
| B29C 45/14 | (2006.01) |
| H01R 43/24 | (2006.01) |
| H01R 107/00 | (2006.01) |
| B29L 31/34 | (2006.01) |

(52) U.S. Cl.
CPC ............. *H01R 24/40* (2013.01); *B29C 45/14* (2013.01); *H01R 43/16* (2013.01); *H01R 43/24* (2013.01); *B29L 2031/3493* (2013.01); *H01R 2107/00* (2013.01)

(58) Field of Classification Search
CPC ..... H01R 17/12; H01R 103/00; H01R 9/0518
USPC .................................................. 439/578–585
See application file for complete search history.

(56) References Cited

U.S. PATENT DOCUMENTS

| 3,936,132 | A | 2/1976 | Hutter |
| 5,312,271 | A | 5/1994 | Matsumoto et al. |
| 8,336,483 | B2 | 12/2012 | Davis |
| 2011/0003507 | A1 | 1/2011 | Van Swearingen et al. |
| 2012/0094521 | A1* | 4/2012 | Montena ............... H01R 13/639 439/345 |
| 2012/0202372 | A1* | 8/2012 | Hardy ................... H01R 9/0518 439/460 |

FOREIGN PATENT DOCUMENTS

DE    10 2011 076881 A1    12/2012

OTHER PUBLICATIONS

International Search Report, International Application No. PCT/US2016/067649, International Filing Date Dec. 20, 2016.

* cited by examiner

*Primary Examiner* — Phuong Chi T Nguyen

(57) ABSTRACT

A connector assembly includes an outer contact and a cavity insert. The outer contact has a mating segment, a terminating segment, and a middle segment therebetween. The mating segment is configured to engage a mating outer contact of a mating connector assembly. The terminating segment is configured to be terminated to a cable. The cavity insert surrounds the middle segment of the outer contact. The cavity insert has an overmold body. An interior surface of the overmold body engages an exterior surface of the outer contact and follows contours of the exterior surface along the middle segment.

13 Claims, 5 Drawing Sheets

CONNECTOR ASSEMBLY

BACKGROUND OF THE INVENTION

The subject matter herein relates generally to connector assemblies.

Radio frequency (RF) connector assemblies are used for numerous applications including military applications and automotive applications. For example, RF connector assemblies may be used with global positioning systems (GPS), antennas, radios, mobile phones, multimedia devices, and the like. The connector assemblies are typically coaxial cable connectors that are provided at the end of coaxial cables.

In order to standardize various types of connector assemblies, particularly the interfaces for such connector assemblies, certain industry standards have been established. One of these standards is referred to as FAKRA, which is an abbreviation for the German term Fachnormenausschuss Kraftfahrzeugindustrie. FAKRA is the Automotive Standards Committee in the German Institute for Standardization, representing international standardization interests in the automotive field. The FAKRA standard provides a system, based on keying and color coding, for proper connector attachment. Specific jack keys can only be connected to like plug keyways in FAKRA connectors. Secure positioning and locking of connector housings is facilitated by way of a FAKRA defined catch on the housing of a jack or first assembly and a cooperating latch on the housing of a plug or second assembly.

The connector assemblies include an outer contact that is received within a cavity of an outer housing during assembly of the connector assembly. An adapter referred to as a cavity insert may be used to retain the outer contact within the cavity of the outer housing. The cavity insert may allow the same outer contact to be compatible with various different outer housings, and vice-versa. The manufacture of the cavity inserts and the assembly of the connector assemblies with the cavity inserts has issues. For example, the cavity inserts may be molded on a plastic carrier strip that holds a multitude of cavity inserts. After the molding process, the cavity inserts on the plastic carrier strip are wound into a reel to package the cavity inserts for transporting. The outer contacts of the connector assemblies may also be formed on a carrier strip and reeled after formation, so both the reels of the outer contacts and the cavity inserts are un-reeled in order to load the cavity inserts on the corresponding outer contacts. Afterwards, the combination cavity inserts on outer contacts may be re-reeled on the plastic carrier strip for the next step in the assembly process or for shipment to a customer. Plastic carrier strips are not very durable, and the repeated reeling and un-reeling steps increases the chances of the plastic carrier strips breaking.

Another issue with cavity inserts is that typically the allowable dimensions of the cavity inserts are strictly limited in order for the cavity inserts to both surround the outer contacts and fit within the cavities of the outer housings. Depending on the diameters of the ends of the outer contacts, the cavity insert may not be able to fit over an end of the outer contact to slide into position surrounding a portion of the outer contact. Also, at least one of the ends of the outer contact may be fixed to the carrier strip of the outer contacts. The carrier strip may block the ability for the cavity insert to be loaded onto the outer contact from the end fixed to the carrier strip.

A need remains for a connector assembly that addresses the durability issue with the plastic carrier strip and the loading issue with fitting the cavity insert around the outer contact.

BRIEF DESCRIPTION OF THE INVENTION

In one embodiment, a connector assembly is provided that includes an outer contact and a cavity insert. The outer contact has a mating segment, a terminating segment, and a middle segment therebetween. The mating segment is configured to engage a mating outer contact of a mating connector assembly. The terminating segment is configured to be terminated to the cable. The cavity insert surrounds the middle segment of the outer contact. The cavity insert has an overmold body. An interior surface of the overmold body engages an exterior surface of the outer contact and follows contours of the exterior surface along the middle segment.

In another embodiment, a connector assembly is provided that includes a center contact, a dielectric body, an outer contact, and a cavity insert. The dielectric body surrounds the center contact. The outer contact surrounds the dielectric body and the center contact. The outer contact has a cylindrical shape and defines a channel that receives the dielectric body and the center contact therein. The outer contact includes a mating segment, a terminating segment, and a middle segment disposed therebetween. The mating segment is configured to engage a mating outer contact of a mating connector assembly. The terminating segment is configured to be terminated to a cable. At least one of the mating segment or the terminating segment of the outer contact is fixed to a carrier strip. The carrier strip holds at least one other outer contact at a spaced apart location from the outer contact of the connector assembly. The cavity insert surrounds the middle segment of the outer contact. The cavity insert has an overmold body. An interior surface of the overmold body engages an exterior surface of the outer contact and follows contours of the exterior surface along the middle segment.

In another embodiment, a method for assembling a connector assembly is provided that includes forming an outer contact by stamping and bending a workpiece that is fixed to a carrier strip. The workpiece is formed into a cylindrical shape that defines a channel. The formed outer contact remains fixed to the carrier strip. The outer contact includes a mating segment, a terminating segment, and a middle segment therebetween. The method also includes overmolding a cavity insert along a perimeter of the middle segment such that the cavity insert surrounds the middle segment. The cavity insert has an interior surface that engages an exterior surface of the outer contact and follows contours of the exterior surface along the middle segment. The method further includes loading a dielectric body and a center contact into the channel of the outer contact. The dielectric body surrounds the center contact within the channel.

DETAILED DESCRIPTION OF THE INVENTION

Figure 1:
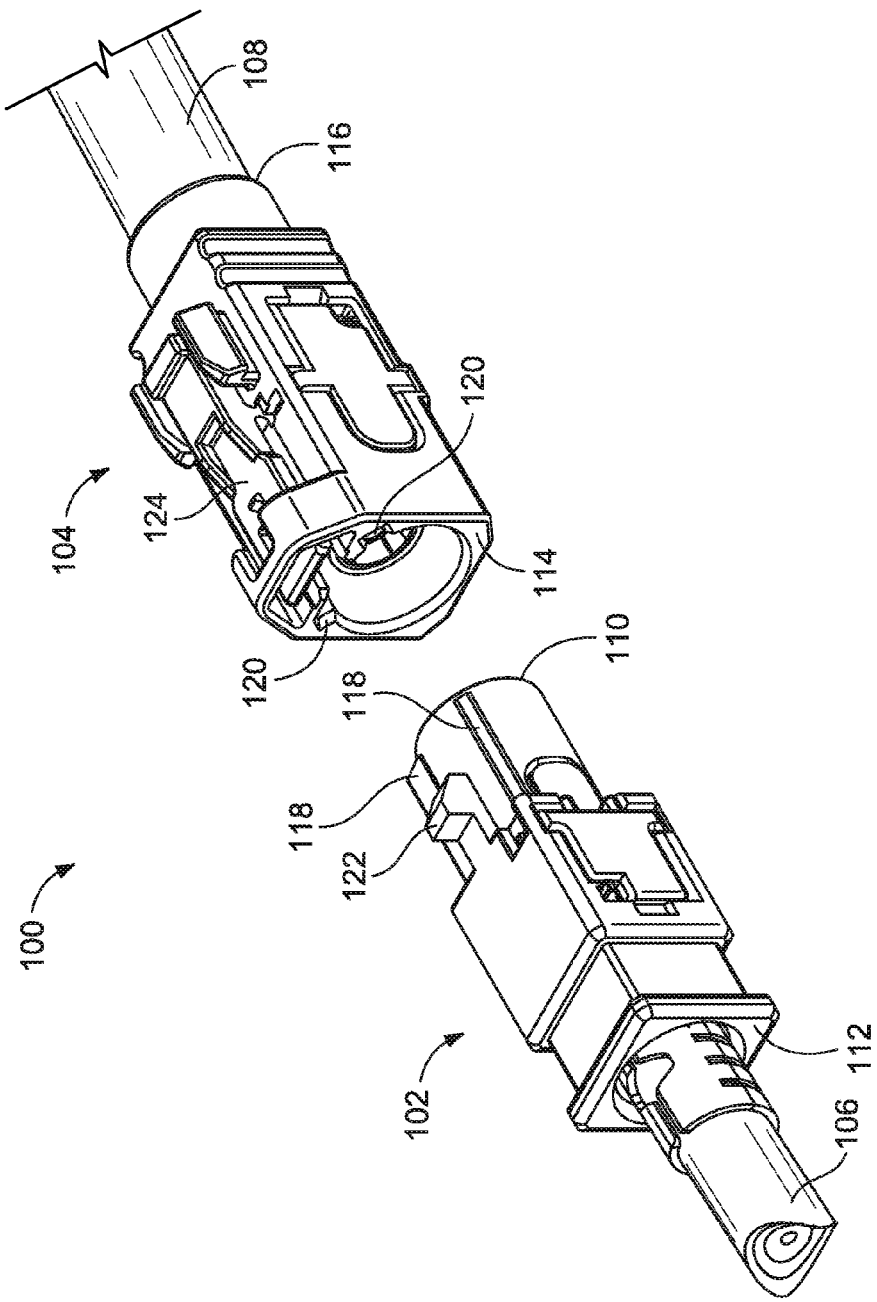
FIG. 1 illustrates a connector system formed in accordance with one embodiment including a first connector assembly and a second connector assembly.

FIG. 1 illustrates a connector system 100 formed in accordance with an exemplary embodiment. The connector system 100 includes a first connector assembly 102 and a second connector assembly 104. The first connector assembly 102 and the second connector assembly 104 are configured to be connected together to transmit electrical signals therebetween. For example, a center contact and an outer contact of the first connector assembly 102 may engage respective center and outer contacts of the second connector assembly 104 to provide a conductive signal path across the connector assemblies 102, 104. Optionally, the center contact of the first connector assembly 102 has a pin at a mating end 110 that is configured to engage a socket of the center contact of the second connector assembly 104 at a mating end 114. Alternatively, the second connector assembly 104 may have a pin, and the first connector assembly 102 may have a socket that receives the pin.

In the illustrated embodiment, the first connector assembly 102 and the second connector assembly 104 constitute FAKRA connectors. FAKRA connectors are RF connectors that have an interface that complies with the standard for a uniform connector system established by the FAKRA automobile expert group. The FAKRA connectors have a standardized keying system and locking system that fulfill the high functional and safety requirements of automotive applications. The FAKRA connectors are based on a subminiature version B connector (SMB connector) that feature snap-on coupling and are designed to operate at specific impedances, such as 50, 75, 93, and/or 125 Ohms. The connector system 100 may utilize other types of connectors other than the FAKRA connectors described herein.

During mating, the mating end 110 of the first connector assembly 102 is plugged into the mating end 114 of the second connector assembly 104. The first connector assembly 102 has a latching feature 122 that is configured to engage a corresponding latching feature 124 of the second connector assembly 104 to retain a mating connection between the connector assemblies 102, 104. In the illustrated embodiment, the latching feature 122 is a catch, and the latching feature 124 is a latch that engages the catch to hold the first and second connector assemblies 102, 104 together.

The first connector assembly 102 has a cable end 112 that is terminated to a cable 106. The second connector assembly 104 likewise has a cable end 116 that is terminated to a cable 108. The cables 106, 108 may be coaxial cables. For example, the cables 106, 108 may be coaxial cables of type RG-59, RG-62, RG-71, or the like. Signals transmitted along the cables 106, 108 are transferred through the first and second connector assemblies 102, 104 when mated.

The first connector assembly 102 has one or more keying features 118. The second connector assembly 104 has one or more keying features 120 that correspond with the keying features 118 of the first connector assembly 102. In the illustrated embodiment, the keying features 118 of the first connector assembly 102 are ribs, and the corresponding keying features 120 of the second connector assembly 104 are channels that receive the ribs. The keying features 118, 120 may have other shapes, sizes, and/or numbers in other embodiments. The keying features 118, 120 may be part of a standardized design of the FAKRA connector standard.

Figure 2:
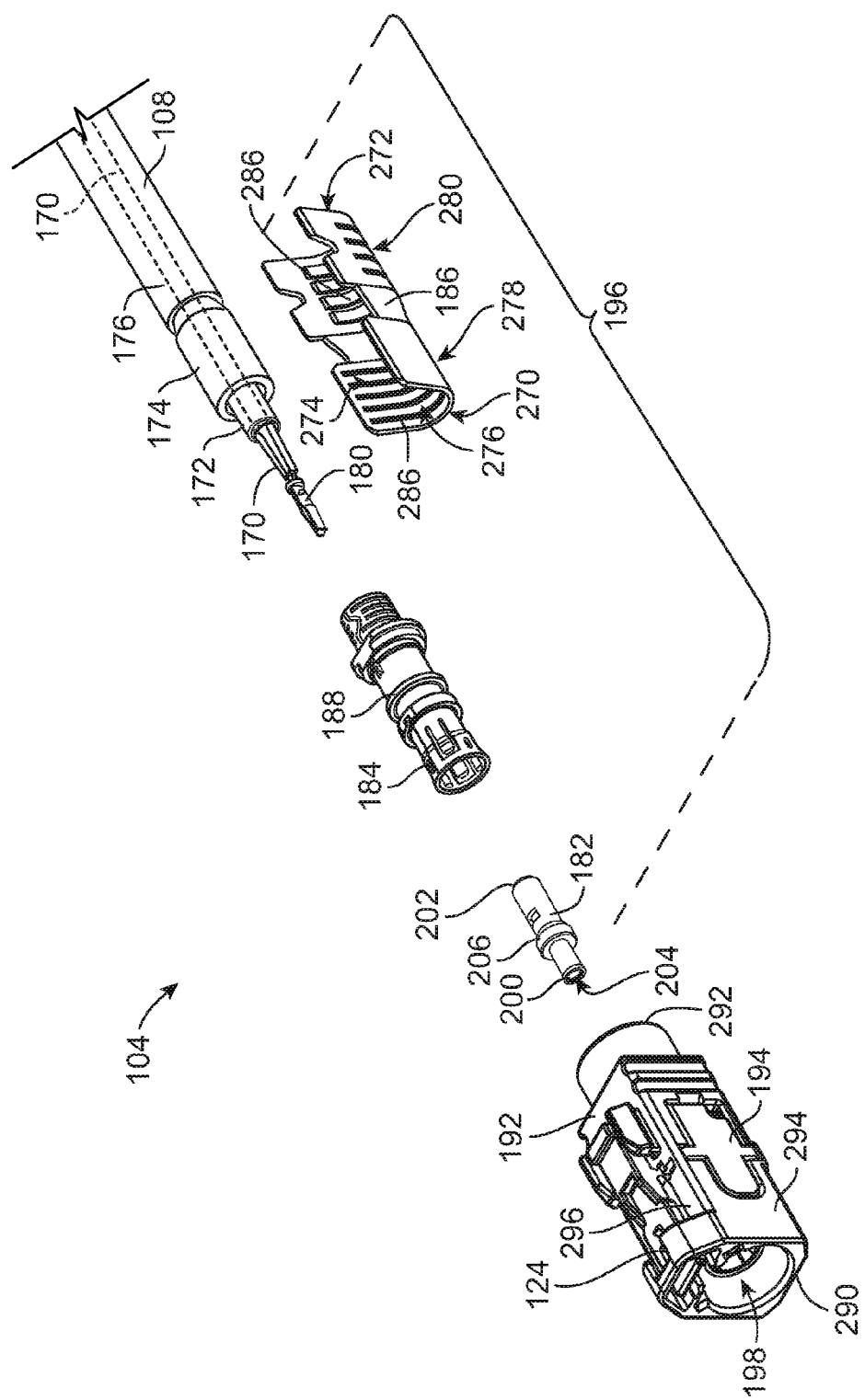
FIG. 2 is an exploded view of the second connector assembly shown in FIG. 1.

FIG. 2 is an exploded view of the second connector assembly 104. The second connector assembly 104 includes a center contact 180, a dielectric body 182, an outer contact 184, a cavity insert 188, and an outer housing 192. The cable 108 that terminates to the second connector assembly 104 is also shown in FIG. 2. An outer ferrule 186 may be used to fasten the cable 108 to the second connector assembly 104. In other embodiments, the second connector assembly 104 may include one or more additional components and/or may not include all of the components listed above. Although the figures and the description herein are directed to the second connector assembly 104, the description may also apply to the first connector assembly 102 (shown in FIG. 1).

The cable 108 has a center conductor 170 that is surrounded by a dielectric layer 172. A cable braid 174 surrounds the dielectric layer 172. The cable braid 174 provides shielding for the center conductor 170 along the length of the cable 108. A cable jacket 176 surrounds the cable braid 174 and provides protection for the cable braid 174, the dielectric layer 172, and the center conductor 170 from external forces and contaminants.

The center contact 180 is formed of an electrically conductive material, such as one or more metals. In the illustrated embodiment, the center contact 180 of the second connector assembly 104 constitutes a socket contact that is configured to receive and electrically engage a pin contact of the first connector assembly 102 (shown in FIG. 1). However, the center contact 180 may be another type of contact in an alternative embodiment. The center contact 180 is terminated to the center conductor 170 of the cable 108. For example, the center contact 180 may be crimped to the center conductor 170.

The dielectric body 182 receives and holds the center contact 180 and may also hold a portion of the center conductor 170 of the cable 108. The dielectric body 182 is received within the outer contact 184 during assembly. The dielectric body 182 electrically insulates the center contact 180 from the outer contact 184. The dielectric body 182 extends between a front 200 and a rear 202. The dielectric body 182 has a cavity 204 that receives the center contact 180 therein. The dielectric body 182 includes a flange 206 that extends radially outward along a perimeter of the dielectric body 182. The flange 206 may be used to position and retain the dielectric body 182 within the outer contact 184.

The outer contact 184 surrounds the dielectric body 182 (and the center contact 180 therein). The outer contact 184 provides shielding for the center contact 180, such as from electromagnetic or radio frequency interference. The outer contact 184 is formed of an electrically conductive material, such as one or more metals. In an embodiment, the outer contact 184 is stamped and formed from a generally flat workpiece, such as a panel or sheet of metal. The outer contact 184 may be configured to be electrically connected to the cable braid 174 or another conductive component of the cable 108.

The cavity insert 188 surrounds a perimeter of the outer contact 184 along at least an axial portion of the outer contact 184. The cavity insert 188 is received within the outer housing 192. The cavity insert 188 is used to hold the outer contact 184 within the outer housing 192. For example, the cavity insert 188 may have a predetermined outer perimeter that corresponds with the outer housing 192 such that the cavity insert 188 engages the outer housing 192 and is secured within the outer housing 192. An inner perimeter of the cavity insert 188 engages the outer contact 184 and secures the outer contact 184 to the cavity insert 188. The cavity insert 188 thus is configured to retain the outer contact 184 in the outer housing 192. The cavity insert 188 may be an adapter member that allows multiple different outer contacts to be held within a single outer housing and/or allows for a single outer contact to be held within multiple different outer housings. The cavity insert 188 may be formed of a dielectric material, such as one or more thermoplastics or other polymers.

The center contact 180, the dielectric body 182, the outer contact 184, and the cavity insert 188 define a contact subassembly 196 that is configured to be loaded into the outer housing 192. The contact subassembly 196 optionally may be assembled and then loaded into the outer housing 192 as a unit. The contact subassembly 196 may be assembled by loading the center contact 180 into the cavity 204 of the dielectric body 182, and loading the dielectric body 182 into the outer contact 184, which is surrounded by the cavity insert 188. The order of assembly is not limited to one specific order.

The outer housing 192 defines a cavity 198 that receives the contact subassembly 196 therein. A retainer 194 may be installed in the outer housing 192 to hold the contact subassembly 196 in the cavity 198 and provide position assurance. The outer housing 192 extends between a front 290 and a rear 292. The retainer 194 is loaded through a side 294 of the outer housing 192. The latching feature 124 of the second connector assembly 104 is provided along a top 296 of the outer housing 192. As used herein, relative or spatial terms such as "front," "rear," "left," "right," "top," or "bottom" are only used to distinguish the referenced elements and do not necessarily require particular positions or orientations in the connector system 100 (shown in FIG. 1), in the connector assembly 104, or in the surrounding environment. The outer housing 192 may have a generally box-shaped outer profile. The cavity 198 of the outer housing 192 is generally a cylindrical bore extending through the outer housing 192. The cavity 198 may have steps, shoulders and/or channels formed therein for engaging and holding the cavity insert 188 and/or other components of the contact subassembly 196.

The outer ferrule 186 is configured to be crimped to the cable 108 and the outer contact 184. The outer ferrule 186 provides an electrical connection between the cable braid 174 and the outer contact 184. The outer ferrule 186 also mechanically couples the cable 108 to the outer contact 184 to provide strain relief at the interface. The outer ferrule 186 may be configured to be crimped to both the cable braid 174 and the cable jacket 176 of the cable 108, such as via a bypass crimp or another type of crimp. Optionally, the outer ferrule 186 may be stamped and formed from a flat workpiece. The outer ferrule 186 may be formed into an open barrel shape that has an open top 274. The outer ferrule 186 defines a channel 276 that receives the cable 108 and the outer contact 184 therein. The outer ferrule 186 includes a braid segment 278 at a front 270 of the outer ferrule 186 that is configured to crimp the cable braid 174 to the outer contact 184. Optionally, the outer ferrule 186 also includes a jacket segment 280 at a rear 272 of the outer ferrule 186 that is configured to engage the cable jacket 176 to provide stress and strain relief. The outer ferrule 186 may define grooves or serrations 286 to enhance the grip of the outer ferrule 186 on the cable 108.

Figure 3:
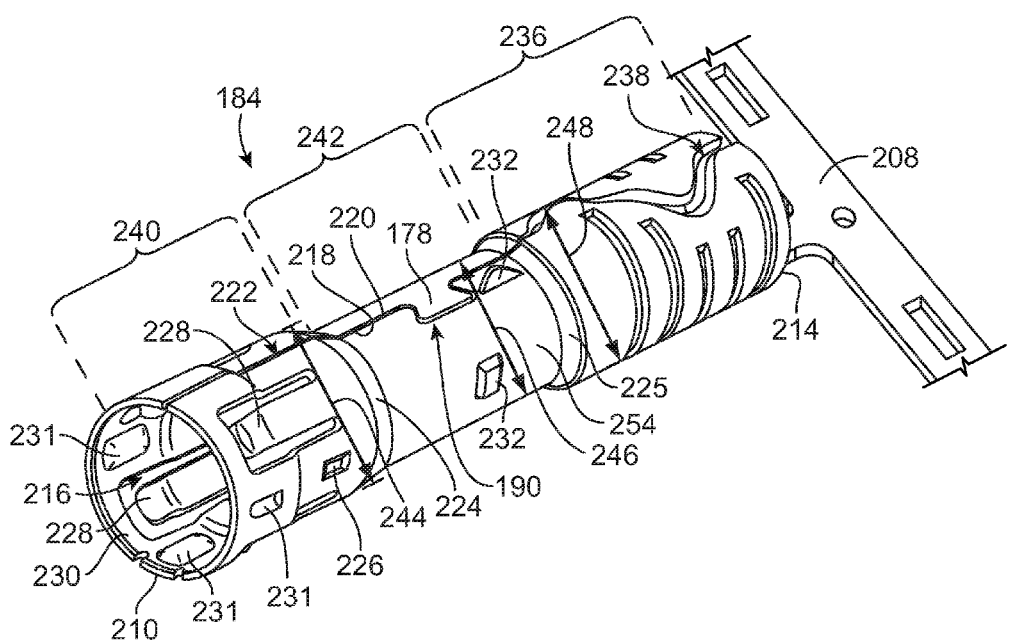
FIG. 3 is a perspective view of an outer contact of the second connector assembly according to an embodiment.

FIG. 3 is a perspective view of the outer contact 184 of the second connector assembly 104 (shown in FIG. 2) according to an embodiment. The outer contact 184 extends between a front 210 and a rear 214. The outer contact 184 defines a channel 216 extending through the outer contact 184 between the front 210 and the rear 214. The outer contact 184 may be generally cylindrical, although different segments or portions of the outer contact 184 may have different diameters. For example, the outer contact 184 may have a barrel shape that is stepped to different diameters along different axial portions. In an embodiment, the outer contact 184 includes a mating segment 240, a terminating segment 236, and a middle segment 242. The middle segment 242 is disposed between the mating segment 240 and the terminating segment 236. The mating segment 240 extends from the front 210 to the middle segment 242. The terminating segment 236 extends from the rear 214 to the middle segment 242.

The mating segment 240 is configured to engage a mating outer contact (not shown) of the first connector assembly 102 (shown in FIG. 1). In the illustrated embodiment, the mating segment 240 includes a plurality of deflectable contact beams 228 that are configured to engage the mating outer contact of the first connector assembly 102. The mating segment 240 may have an outer diameter 244 that is large enough to accommodate a distal end of the mating outer contact within the channel 216 of the outer contact 184. The contact beams 228 may be biased to extend at least partially into the channel 216 to ensure that the contact beams 228 engage the mating outer contact. Optionally, the mating segment 240 may include a ring 230 at the front 210 that is positioned forward of the contact beams 228 to protect the contact beams 228 from damage during loading of the outer contact 184 into the outer housing 192 (shown in FIG. 2) and/or during mating with the first connector assembly 102. The mating segment 240 may also include a plurality of protrusions 231 that extend radially inward into the channel 216. The protrusions 231 may be positioned between the contact beams 228 and, like the contact beams 228, may be configured to engage the mating outer contact of the first connector assembly 102.

Figure 4:
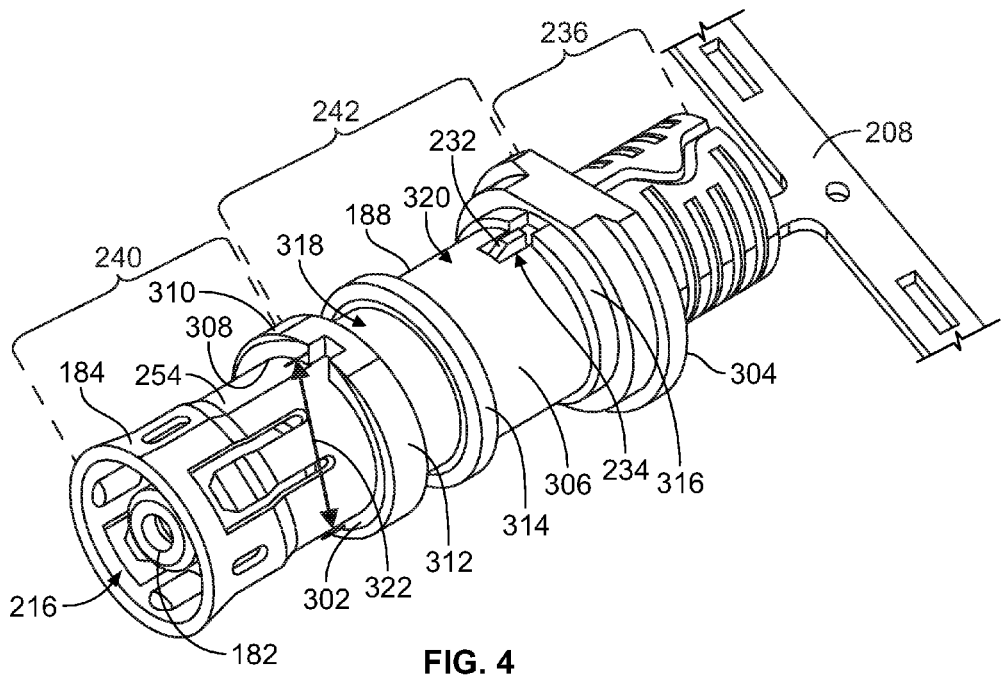
FIG. 4 is a perspective view of a cavity insert of the second connector assembly loaded on the outer contact according to an embodiment.

The middle segment 242 is rearward of the mating segment 240. The middle segment 242 is configured to be peripherally surrounded by the cavity insert 188 (shown in FIG. 2). The middle segment 242 may include at least one securing feature 232 that extends from an exterior surface 254 of the outer contact 184. The securing feature 232 is configured to engage a complementary securing feature 234 (shown in FIG. 4) on the cavity insert 188 to hold the axial and rotational orientation of the outer contact 184 with respect to the cavity insert 188. For example, the securing feature 232 may be a positioning tab that extends radially outward from the middle segment 242. The positioning tab may be received in an aperture of the cavity insert 188 that forms the securing feature 234 of the cavity insert 188, as shown in FIG. 4. Alternatively, the securing feature 232 may extend radially inward towards the channel 216 of the outer contact 184.

In an exemplary embodiment, the middle segment 242 has an outer diameter 246 that is less than the outer diameter 244 of the mating segment 240. The diameter 246 allows the middle segment 242 of the outer contact 184 to be surrounded by the cavity insert 188 (shown in FIG. 2) while the cavity insert 188 fits within the cavity 198 (FIG. 2) of the outer housing 192 (FIG. 2). For example, if the outer diameter 246 of the middle segment 242 is not reduced compared to the mating segment 240, the cavity insert 188 would need to be formed with a larger diameter to fit over and surround the outer contact 184, and the resulting larger cavity insert 188 would not fit properly within the cavity 198 of the outer housing 192. The size of the cavity 198 of the outer housing 192 may be pre-defined based on industry standards and specifications, so it may not be feasible to increase the size of the cavity 198 to accommodate a larger cavity insert 188. As such, the outer diameter 246 of the middle segment 242 is limited to a narrow range of sizes in order to allow the cavity insert 188 to fit within a pre-defined cavity 198 of the outer housing 192.

The terminating segment 236 is configured to be terminated to the cable 108 (shown in FIG. 2), such as to the cable braid 174 (FIG. 2) of the cable 108. In an embodiment, the terminating segment 236 has an outer diameter 248 that is greater than the outer diameter 246 of the middle segment 242. The outer diameter 248 of the terminating segment 236 may be based on the size or gauge of the cable 108 that is terminated to the outer contact 184. For example, the terminating segment 236 may have a larger diameter 248 than the diameter 246 of the middle segment 242 in order to accommodate larger-sized cables 108. The diameter 248 of the terminating segment 236 is stepped up from the middle segment 242 to allow the outer contact 184 to simultaneously accommodate a large diameter cable 108 and a smaller diameter cavity insert 188 (shown in FIG. 2) that fits within a pre-defined cavity 198 (FIG. 2) of the outer housing 192 (FIG. 2).

In the illustrated embodiment, the outer diameter 246 of the middle segment 242 is less than both of the respective outer diameters 244, 248 of the mating segment 240 and the terminating segment 236. The outer contact 184 is stepped along the length and defines a first shoulder 224 and a second shoulder 225. The first shoulder 224 separates the mating segment 240 from the middle segment 242. The second shoulder 225 separates the middle segment 242 from the terminating segment 236. Moving rearward from the front 210 of the outer contact 184, the first shoulder 224 steps down from the mating segment 240 to the middle segment 242, and the second shoulder 225 steps up from the middle segment 242 to the terminating segment 236. In an alternative embodiment, the outer diameter 246 of the middle segment 242 may be equal to or greater than at least one of the outer diameters 244, 248 of the respective mating segment 240 and terminating segment 236.

Optionally, the outer contact 184 may include at least one retention tab 226 that extends into the channel 216. The retention tab 226 may be configured to engage the dielectric body 182 (shown in FIG. 2) that is loaded within the channel 216 during assembly in order to hold the dielectric body 182 in the outer contact 184. For example, when the dielectric body 182 is loaded into the channel 216, the flange 206 (FIG. 2) may be received in a position between the retention tab 226 and the first shoulder 224. A rear-facing surface of the flange 206 may engage the first shoulder 224, and a front-facing surface of the flange 206 may engage the retention tab 226. The flange 206 is thus captured between the shoulder 224 and the retention tab 226 to hold the axial position of the dielectric body 182 relative to the outer contact 184. Other types of securing or positioning elements may be used in alternative embodiments for positioning or securing the dielectric body 182 in the outer contact 184.

In an embodiment, the outer contact 184 is stamped and formed into the cylindrical shape from a workpiece, such as a flat sheet or panel. The workpiece may be composed of a metal material, such as copper, silver, or an alloy of multiple different metals. The workpiece has a first end 218 and a second end 220. The first and second ends 218, 220 may be bent and rolled toward one another into the cylindrical barrel shape until the first and second ends 218, 220 oppose one another. A seam 222 is formed at the interface between the first and second ends 218, 220. The seam 222 extends through a thickness of the outer contact 184 and is fluidly coupled to the interior channel 216. The first and second ends 218, 220 may engage one another at the seam 222. The first and second ends 218, 220 may be secured together at the seam 222 to retain the barrel shape. For example, the second end 220 may have a tab 178 that is received and retained within a complementary cut-out pocket 190 defined in the first end 218, or vice-versa. Optionally, the tab 178 and pocket 190 may be axially located along the middle segment 242. In an alternative embodiment, rather than being stamped and formed, the outer contact 184 may be made by another manufacturing method, such as die-casting, extrusion, screw machining, or the like.

Optionally, the seam 222 defines a gap 238 along the terminating segment 236 between the first and second ends 218, 220. The gap 238 may extend along a tortuous path, as shown in FIG. 3. The size of the gap 238 is variable to change a diameter of the terminating segment 236. Changing the size of the gap 238 changes the diameter of the terminating segment 236, thereby affecting the capacitance between the center contact 180 (shown in FIG. 2) and the outer contact 184 and controlling the impedance. The size of the gap 238 may be controlled by the outer ferrule 186 (shown in FIG. 2). For example, crimping the outer ferrule 186 around the terminating segment 236 reduces the gap 238, which affects the impedance.

In the illustrated embodiment, the outer contact 184 is fixed to a carrier strip 208. The carrier strip 208 is composed of a metal material, like the outer contact 184. The outer contact 184 may be integral to the carrier strip 208. In addition to the outer contact 184, the carrier strip 208 may hold at least one other outer contact (not shown) along a length of the carrier strip 208. The at least one other outer contact is held at a spaced apart location from the outer contact 184 of the connector assembly 104 (shown in FIG. 2). For example, the outer contact 184 may be formed into the cylindrical shape along with hundreds or thousands of similar outer contacts on the same carrier strip 208. The outer contact 184 may be severed from the carrier strip 208 prior to insertion of the outer contact 184 into the outer housing 192 (shown in FIG. 2) and/or prior to termination of the outer contact 184 to the cable 108 (FIG. 2). In the illustrated embodiment, the carrier strip 208 is coupled to the terminating segment 236 of the outer contact 184. Alternatively, or in addition, the carrier strip 208 may be coupled to the mating segment 240 of the outer contact 184.

FIG. 4 is a perspective view of the cavity insert 188 of the second connector assembly 104 (shown in FIG. 2) loaded on the outer contact 184 according to an embodiment. The dielectric body 182 is shown within the channel 216 of the outer contact 184. The cavity insert 188 includes a front end 302 and a rear end 304. The cavity insert 188 surrounds the middle segment 242, such that the cavity insert 188 extends around a perimeter of the middle segment 242. Optionally, the cavity insert 188 may surround at least part of the mating segment 240 and/or the terminating segment 236 of the outer contact 184 in addition to the middle segment 242.

In an embodiment, the cavity insert 188 has an overmold body 306. The overmold body 306 is seamless. The overmold body 306 is barrel-shaped with one or more cylindrical regions. The cavity insert 188 has an interior surface 308. The interior surface 308 engages the exterior surface 254 of the outer contact 184 and follows contours of the exterior surface 254 along the middle segment 242.

As described further below, the cavity insert 188 may be overmolded onto the exterior surface 254 of the outer contact 184 such that the cavity insert 188 is formed in-situ on the outer contact 184. The cavity insert 188 may be molded around the outer contact 184 by placing a mold around the middle segment 242 of the outer contact 184 and injecting a heated thermoplastic material into the mold. The heated thermoplastic material may flow into various nooks and crevices in the space between the mold and the exterior surface 254 of the outer contact 184. After the heated thermoplastic material is at least partially cooled, forming the seamless overmold body 306, the mold may be removed from the middle segment 242. Due to the overmolding process, a substantial entirety of the interior surface 308 of the overmold body 306 engages the exterior surface 254 of the outer contact 184. For example, since the cavity insert 188 is molded around the outer contact 184, the interior surface 308 forms around and is defined by the exterior surface 254 of the outer contact 184. Thus, substantially the entire interior surface 308 of the overmold body 306 engages the exterior surface 254, and little to no radial clearance exists between the outer contact 184 and the cavity insert 188. Since the cavity insert 188 is overmolded in situ on the outer contact 184, the cavity insert 188 may never be coupled to a plastic carrier strip. The overmolded cavity insert 188 may avoid issues associated with plastic carrier strips, including a lack of robustness and resilience that could lead to breaking and the need for additional assembly steps involving removing the cavity insert from the carrier strip.

Figure 6:
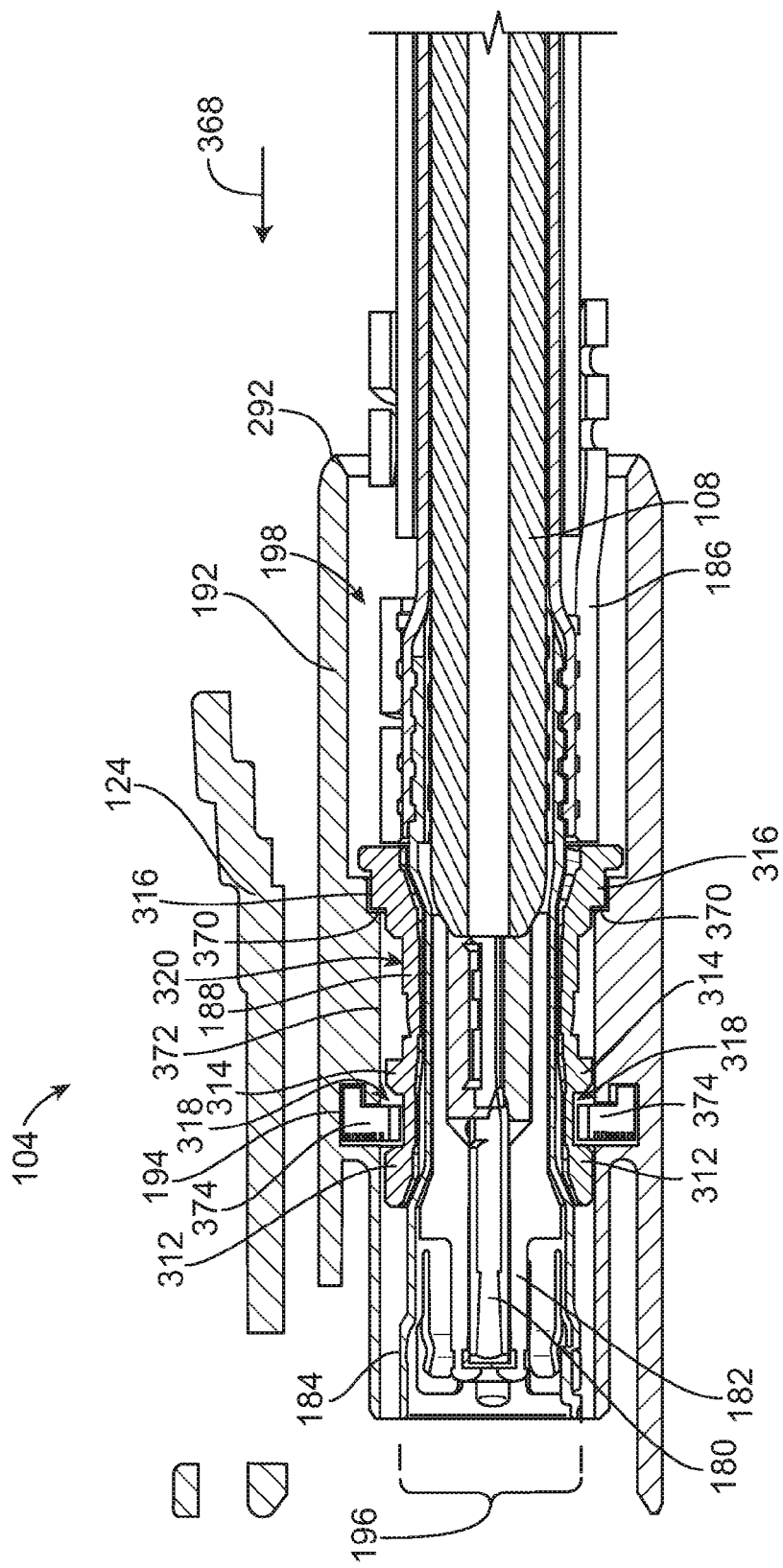
FIG. 6 is a cross-sectional view of the second connector assembly according to an embodiment.

The cavity insert 188 includes at least one flange that extends circumferentially around the cavity insert 188. The flanges extend radially outward from an exterior surface 310 of the overmold body 306. The flanges are configured to be received within the outer housing 192 (shown in FIG. 2) to engage surfaces in the outer housing 192 to retain an axial position of the contact subassembly 196 (FIG. 2) within the cavity 198 (FIG. 2) of the outer housing 192. For example, in the illustrated embodiment, the cavity insert 188 includes at least a front flange 312, a middle flange 314, and a rear flange 316. It is recognized that the flanges 312-316 need not be disposed at the front end 302, an axial midpoint, and the rear end 304 of the cavity insert 188, respectively. For example, the middle flange 314 may be located more proximal to the front end 302 than the rear end 304. The flanges 312-316 define grooves that are formed therebetween. For example, a first groove 318 may be formed between the front and middle flanges 312, 314, and a second groove 320 may be formed between the middle and the rear flanges 314, 316. In an embodiment, when the contact subassembly 196 is loaded into the outer housing 192, a portion of the retainer 194 (FIG. 2) is received within the first groove 260. The rear-facing surface of the retainer 194 may engage the middle flange 314 and a front-facing surface of the retainer 194 may contact the front flange 312, as shown in FIG. 6, to hold the cavity insert 188 in the cavity 198 of the outer housing 192.

The interior surface 308 is generally cylindrical and defines an inner diameter 322 of the cavity insert 188. In an embodiment, the inner diameter 322 of the cavity insert 188 is approximately the same as the outer diameter 246 (shown in FIG. 3) of the middle segment 242 of the outer contact 184. The inner diameter 322 may refer to the axial portion of the overmold body 306 that has the smallest diameter. Optionally, the inner diameter 322 of the cavity insert 188 may be less than both the outer diameter 244 (shown in FIG. 3) of the mating segment 240 and the outer diameter 248 (FIG. 3) of the terminating segment 236. Since the inner diameter 322 is smaller than both the outer diameters 244, 248 of the mating segment 240 and the terminating segment 236, which bookend the middle segment 242, the cavity insert 188 would not be able to be loaded onto the outer contact 184 by sliding the cavity insert 188 over either the front 210 or the rear 214 of the outer contact 184. For example, if the cavity insert is molded separately and constructed to fit over the front 210 and/or the rear 214, the inner diameter would have to be increased, which would likely increase the size of the cavity insert to a size that is too large for the cavity insert to fit appropriately within the cavity 198 (shown in FIG. 2) of the outer housing 192 (FIG. 2). In an embodiment, the cavity insert 188 is overmolded in situ on the outer contact 184, which avoids issues with fitting a pre-molded cavity insert 188 over ends of the outer contact 184.

In an alternative embodiment, the outer diameter 248 (shown in FIG. 3) of the terminating segment 236 is not larger than the inner diameter 322 of the cavity insert 188 (while the outer diameter 244 of the mating segment 240 is larger than the inner diameter 322). However, the terminating segment 236 may be fixed to the carrier strip 208, as shown in FIG. 4, so a pre-molded cavity insert would still not fit over the terminating segment 236. The carrier strip 208 may be used for packaging purposes in order to hold many outer contacts together during various stages of assembly, so it may not be desirable to sever the outer contact 184 from the carrier strip 208 prematurely in order to provide a path for a pre-molded cavity insert to be loaded onto the outer contact 184. Thus, it may be beneficial to overmold the overmold body 306 of the cavity insert 188 in situ on the middle segment 242 of the outer contact 184 in order to avoid issues with carrier strips interfering with loading a pre-formed cavity insert onto the outer contact 184.

Figure 5:
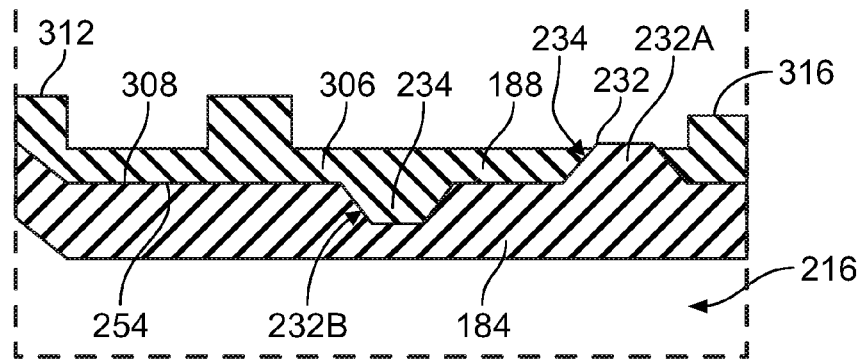
FIG. 5 is a close-up cross-sectional view of a portion of the cavity insert and the outer contact according to an embodiment.

FIG. 5 is a close-up cross-sectional view of a portion of the cavity insert 188 and the outer contact 184 according to an embodiment. The illustrated portion shows an axial length of the cavity insert 188 between the front flange 312 and the rear flange 316 of the cavity insert 188 and a corresponding axial length of the outer contact 184 along the middle segment 242 (shown in FIG. 4). FIG. 5 shows how the interior surface 308 of the overmold body 306 of the cavity insert 188 engages and follows the contours of the exterior surface 254 of the outer contact 184. As shown in FIG. 5, a substantial entirety of the interior surface 308 of the overmold body 306 engages the exterior surface 254 along the profile of the outer contact 184. Thus, the interior profile of the overmold body 306 is defined by the profile of the exterior surface 254 of the outer contact 184. An exterior profile of the overmold body 306, including the flanges 312-316, may be defined by a profile of the mold used to form the overmold body 306 around the perimeter of the middle segment 242.

The overmold body 306 follows the contours of the one or more securing features 232 of the outer contact 184 in order to rotationally and axially secure the cavity insert 188 to the outer contact 184. Thus, the outer contact 184 is not permitted to rotate or translate relative to the cavity insert 188, and vice-versa, once the overmold body 306 surrounds the outer contact 184. In the illustrated embodiment, the middle segment 242 (shown in FIG. 4) of the outer contact 184 includes two securing features 232, including a protrusion 232A and a depression 232B. Both securing features 232 extend from the exterior surface 254, although the depression 232B extends radially inward (towards the channel 216 of the outer contact 184) and the protrusion 232A extends radially outward. The protrusion 232A is also shown as the protrusion 232 in FIG. 4. During the formation of the cavity insert 188, the overmold body 306 fills the depression 232B and surrounds at least most of the protrusion 232A, which secures the cavity insert 188 to the outer contact 184. The portions of the overmold body 306 that fill the depression 232B and surround the protrusion 232A form securing features 234 of the cavity insert 188. Due to the interaction between the securing features 232, 234, neither the cavity insert 188 nor the outer contact 184 are movable axially or rotationally relative to the other component (without damaging one or both components 184, 188). Thus, the cavity insert 188 holds the position of the outer contact 184 relative to the cavity insert 188.

As described above, the outer contact 184 may define a seam 222 (shown in FIG. 3) at an interface between the first and second ends 218, 220 (FIG. 3) of the outer contact 184. The outer contact 184 may define one or more holes or other openings that extend through a thickness of the outer contact 184 and are fluidly coupled to the channel 216. The holes or other openings may be in addition to, or an alternative to, the seam 222. The seam 222 and/or holes may extend along the middle segment 242 (although neither is shown in the cross-section of FIG. 5). Optionally, the connector assembly 104 (shown in FIG. 2) further includes a filling layer (not shown) that is disposed along the middle segment 242 (shown in FIG. 4) between the exterior surface 254 of the outer contact 184 and the interior surface 308 of the cavity insert 188. The filling layer is configured to plug the seam 222 and/or the holes to prohibit the overmold body 306 of the cavity insert 188 from extending through the seam 222 and/or holes into the channel 216. Thus, the filling layer may be applied to the exterior surface 254 prior to the overmold body 306 being molded to the outer contact 184.

The filling layer prohibits heated thermoplastic material from flowing into the channel 216, which may interfere with the assembly of the connector assembly 104 by, for example, blocking proper insertion of the dielectric body 182 into the channel 216. The filling layer may be a solder or an epoxy that is applied directly to the seam 222 and/or the holes to fill in the openings. The filling layer alternatively may be heat-shrink tubing that is applied around a perimeter of the middle segment 242 and then shrunk to conform to the exterior surface 254 along the middle segment 242. As an alternative to applying a filling layer, the first and second ends 218, 220 of the outer contact 184 may be overlapped and/or welded together to fill in the seam 222 at the interface between the ends 218, 220.

FIG. 6 is a cross-sectional view of the second connector assembly 104 according to an embodiment. During assembly, the contact subassembly 196 is loaded into the cavity 198 of the outer housing 192 from the rear 292 of the outer housing 192 in a loading direction 368. The rear flange 316 of the cavity insert 188 contacts a shoulder 370 along an inner surface 372 of the outer housing 192 to prohibit further movement of the contact subassembly 196 in the loading direction 368. An arm 374 of the retainer 194 is received within the first groove 318 of the cavity insert 188 between the front and middle flanges 312, 314. The arm 374 of the retainer 194 contacts the front flange 312 and/or the middle flange 314 to prohibit axial movement of the contact subassembly 196 relative to the retainer 194. The retainer 194 is coupled to the outer housing 192, so the retainer 194 locks the cavity insert 188 into the cavity 198 of the outer housing 192 to hold the axial position of the subassembly 196 within the cavity 198. The retainer 194 also provides position assurance because the retainer 194 is not able to be fully inserted into the outer housing 192 unless the contact subassembly 196 is fully loaded and the first groove 318 aligns with the arm 374 of the retainer 194.

Figure 7:
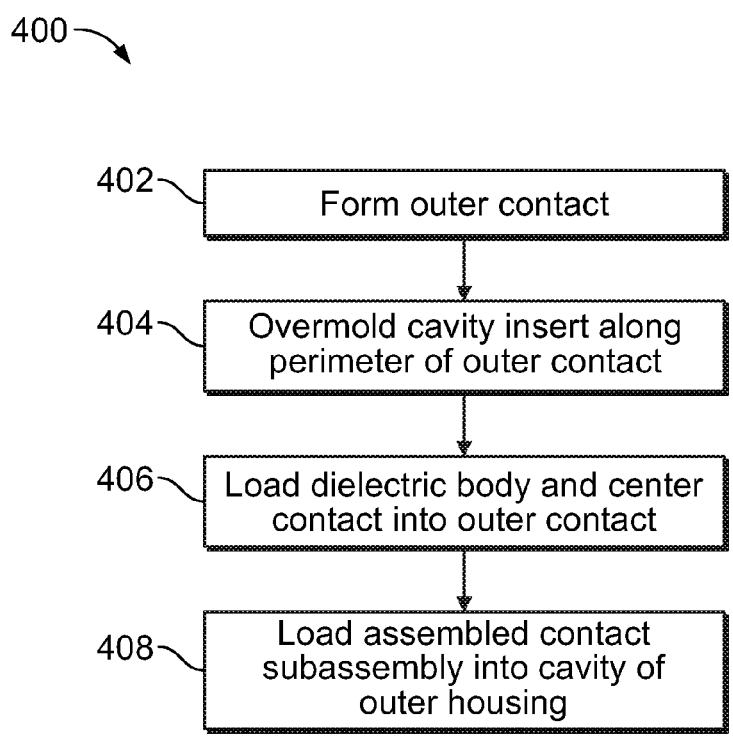
FIG. 7 is flow chart of one embodiment of a method for assembling a connector assembly.

FIG. 7 is flow chart of one embodiment of a method 400 for assembling a connector assembly. The method 400 may be used to assembly the first connector assembly 102 and/or the second connector assembly 104 (both shown in FIG. 1). At 402, an outer contact is formed. The outer contact may be formed by stamping and bending a flat workpiece. The workpiece may be formed into a cylindrical shape that defines a channel. The workpiece may be fixed to a carrier strip, and the formed outer contact optionally may remain fixed to the carrier strip after the forming step. The outer contact includes a mating segment, a terminating segment, and a middle segment disposed therebetween.

At 404, a cavity insert is overmolded along a perimeter of the outer contact such that the cavity insert surrounds the middle segment. The cavity insert has an interior surface that engages an exterior surface of the outer contact. The interior surface follows contours of the exterior surface along the middle segment. The overmolding the cavity insert step may include placing a mold around the middle segment of the outer contact and injecting a heated thermoplastic material into the mold. The mold may be removed from the middle segment after the thermoplastic material has cooled. The cooled thermoplastic material forms an overmold body of the cavity insert.

The middle segment of the outer contact may define at least one of a seam or a hole extending through a thickness of the outer contact such that the seam and/or hole is fluidly coupled to the channel of the outer contact. The method 400 may further include applying a filling layer to the exterior surface of the outer contact along the middle segment prior to overmolding the cavity insert on the outer contact. The filling layer plugs the at least one of the seam or the hole to prohibit the overmold body (for example, the heated thermoplastic material) of the cavity insert from extending therethrough. The application of the filling layer may include at least one of soldering, applying an epoxy to, or applying a heat-shrink tubing to the exterior surface of the outer contact along the middle segment to plug the seam and/or hole.

Optionally, the method 400 may further include removing the outer contact from the carrier strip after the cavity insert is overmolded along the middle segment of the outer contact. As an alternative, the outer contact may be removed from the carrier strip after step 406 or step 408, described below.

At 406, a dielectric body and a center contact are loaded into the channel of the outer contact. The dielectric body surrounds the center contact within the channel. The center contact, the dielectric body, the outer contact, and the cavity insert together define a contact subassembly. At 408, the assembled contact subassembly is loaded into a cavity of an outer housing. The overmold body of the cavity insert may include at least one flange extending along a perimeter of the cavity insert. The at least one flange may engage the outer housing to retain an axial position of the contact subassembly within the cavity of the outer housing. The method 400 may also include terminating the contact subassembly to a cable. For example, the center contact and the outer contact may each be electrically connected to different conductors of the cable when terminated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:
    an outer contact having a mating segment, a terminating segment, and a middle segment therebetween, the mating segment configured to engage a mating outer contact of a mating connector assembly, the terminating segment configured to be terminated to a cable;
    a cavity insert surrounding the middle segment of the outer contact, the cavity insert having an overmold body, an interior surface of the overmold body engaging an exterior surface of the outer contact and following contours of the exterior surface along the middle segment; and
    an outer housing defining a cavity, the outer contact and the cavity insert held within the cavity of the housing, the cavity insert engaging an inner surface of the outer housing to secure an axial position of the outer contact within the cavity of the outer housing;
    wherein the middle segment of the outer contact has an outer diameter that is less than an outer diameter of the mating segment and is less than an outer diameter of the terminating segment, wherein an inner diameter of the cavity insert defined by the interior surface of the overmold body is less than the respective outer diameters of the mating segment and the terminating segment.

2. The connector assembly of claim 1, wherein the terminating segment of the outer contact is integrally fixed to a carrier strip that holds at least one other outer contact at a spaced apart location from the outer contact of the connector assembly.

3. The connector assembly of claim 1, wherein the overmold body of the cavity insert is seamless.

4. The connector assembly of claim 1, wherein the outer contact includes at least one securing feature along the middle segment, each securing feature being a protrusion or a depression extending from the exterior surface, the interior surface of the overmold body following the contours of each securing feature to rotationally and axially secure the cavity insert to the outer contact.

5. The connector assembly of claim 1, wherein the outer contact defines a channel that receives a dielectric body and a center contact therein, the middle segment of the outer contact defining at least one of a seam or a hole extending through a thickness of the outer contact and fluidly coupled to the channel,
    wherein the connector assembly further includes a filling layer disposed along the middle segment between the exterior surface of the outer contact and the interior surface of the cavity insert, the filling layer plugging the at least one of the seam or the hole to prohibit the overmold body of the cavity insert from extending therethrough.

6. The connector assembly of claim 1, wherein a substantial entirety of the interior surface of the overmold body engages the exterior surface of the outer contact.

7. The connector assembly of claim 1, wherein the outer contact defines a channel that receives a dielectric body and a center contact therein, the center contact, the dielectric body, the outer contact, and the cavity insert together defining a contact subassembly that is received within the cavity of the outer housing, the overmold body of the cavity insert defining at least one flange extending radially outward from an exterior surface of the cavity insert, the at least one flange used to retain an axial position of the contact subassembly within the cavity of the outer housing.

8. The connector assembly of claim 1, wherein the middle segment of the outer contact has a cylindrical shape, the overmold body of the cavity insert being molded in situ on the exterior surface of the outer contact along a perimeter of the middle segment.

9. The connector assembly of claim 1, wherein the outer contact is composed of a metal material and the cavity insert is composed of a thermoplastic material.

10. The connector assembly of claim 1, wherein the outer contact includes a seam that extends a length through the mating segment, the middle segment, and the terminating segment, the seam being defined by first and second ends of the outer contact, the first and second ends being spaced apart from each other to define a gap along the terminating segment, a size of the gap between the first and second ends configured to be reduced responsive to terminating the terminating segment to the cable.

11. A connector assembly comprising:
    a center contact;
    a dielectric body surrounding the center contact;
    an outer contact surrounding the dielectric body and the center contact, the outer contact having a cylindrical shape and defining a channel that receives the dielectric body and the center contact therein, the outer contact including a mating segment, a terminating segment, and a middle segment disposed therebetween, the mating segment configured to engage a mating outer contact of a mating connector assembly, the terminating segment configured to be terminated to a cable, the terminating segment being integrally fixed to a carrier strip, the carrier strip holding at least one other outer contact at a spaced apart location from the outer contact of the connector assembly; and
    a cavity insert surrounding the middle segment of the outer contact, the cavity insert having an overmold body, an interior surface of the overmold body engaging an exterior surface of the outer contact and following contours of the exterior surface along the middle segment, wherein an outer diameter of the mating segment of the outer contact is greater than an outer diameter of the middle segment and an inner diameter of the cavity insert that is defined by the interior surface of the overmold body;

wherein the outer contact includes a filling layer disposed on the middle segment between the exterior surface of the outer contact and the interior surface of the cavity insert, the filling layer plugging at least one of a seam or a hole in the outer contact to prohibit the overmold body of the cavity insert from extending through the at least one of the seam or the hole.

12. The connector assembly of claim 11, wherein the outer contact includes at least one securing feature along the middle segment, each securing feature being a protrusion or a depression extending from the exterior surface, the interior surface of the overmold body following the contours of each securing feature to rotationally and axially secure the cavity insert to the outer contact.

13. The connector assembly of claim 11, wherein the overmold body of the cavity insert is seamless and is composed of a thermoplastic material.

* * * * *